UNITED STATES PATENT OFFICE.

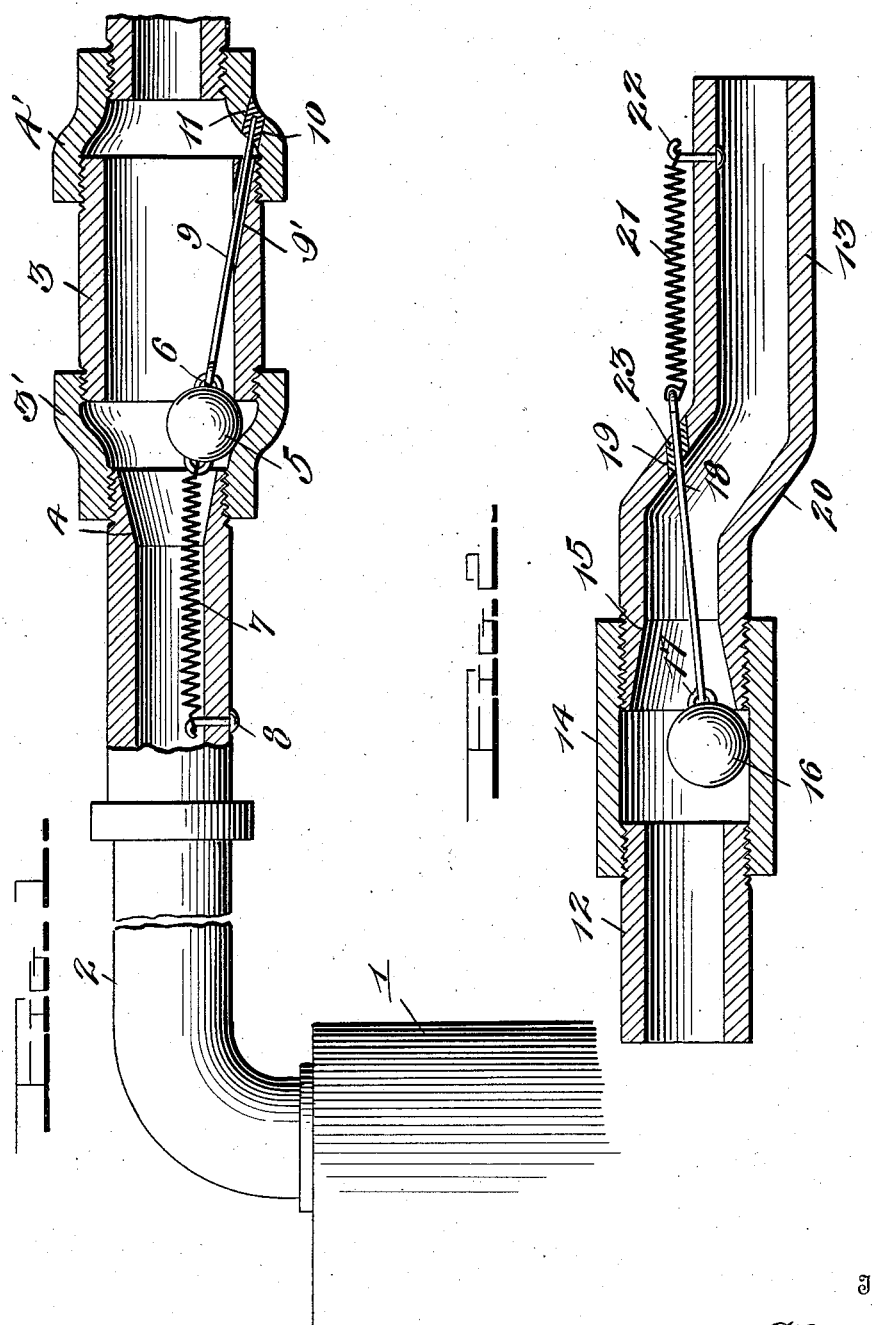

BYRON STEVENS, OF OAKLAND, CALIFORNIA.

SAFETY-VALVE.

1,028,627.   Specification of Letters Patent.   Patented June 4, 1912.

Application filed June 21, 1911.  Serial No. 634,474.

*To all whom it may concern:*

Be it known that I, BYRON STEVENS, a citizen of the United States, residing at Oakland, in the county of Alameda and State of California, have invented certain new and useful Improvements in Safety-Valves, of which the following is a specification, reference being had to the accompanying drawings.

My invention relates to new and useful improvements in safety valves and more particularly to a safety valve used in connection with a gas pipe, and my object is to provide a device of this character which is adapted to automatically close and cut off the flow of gas to the meter in case of fire or the like wherein the heat at any time becomes sufficient to melt the lead connections to the meter.

A further object of the invention resides in providing a valve having connection with a spring, the tendency of which is to cause said valve to be closed, and a further object resides in providing means for holding said valve in open position.

A still further object resides in providing an arm having connection with said valve, which arm is soldered in a connection of the main pipe.

A further object resides in providing a union in which the valve is disposed when in its open position, whereby the flow of gas therethrough will not be affected.

A still further object is to provide a device which is extremely simple in construction, thereby inexpensive to manufacture, and one which is very useful and effective in operation.

With these and other objects in view, my invention consists in the novel features of construction, combination and arrangement of parts as will be hereinafter referred to and more particularly pointed out in the specification and claims.

In the accompanying drawing forming a part of this application, Figure 1 is a side elevation of a pipe partly in section showing my improved device applied thereto, and, Fig. 2 is a section through a slightly modified form of device.

It is customary in practice to install gas meters with tin cases and lead connections, and in case of fire, these meters are sources of trouble, due to the connections melting and allowing the gas to add to the conflagration. It is to avoid this trouble that I provide my improved device, and although I am aware of the fact that other devices for a similar purpose have been invented, my invention is a novel one, as will be noted from the following detailed description thereof.

In carrying out my invention, I shall refer to the drawing in which similar reference characters designate corresponding parts throughout the several views and in which—

1 indicates a gas meter of the usual or any preferred type used in homes and other buildings of a smaller size, and 2 indicates a pipe leading from the main. This pipe 2 is adapted to be formed in sections, and disposed between said sections is a sleeve 3, having a considerably larger bore than said sections, which sleeve is connected to the respective sections by means of the connecting members 3' and 4' threaded on the ends of said sleeve and said pipe sections. This sleeve member 3 and the connecting members 3' and 4', combined, form a substantial union between the two sections of the pipe 2. The one section of the pipe 2, has the bore at the end thereof flared, as shown at 4, to form a seat or the like for a ball valve 5, the periphery of said valve being provided at diametrically opposite points thereon, with the ears 6, and engaging with one of said ears is one end of a coil spring 7, the opposite end of said coil spring being secured by means of a bolt 8 within the section of the pipe having the seat 4 therein. The tendency of the spring 7 is to draw the valve 5 in the seat 4 to stop the flow of gas therethrough, and in order to provide means for the retention of said valve 5 in a position to allow the gas to flow to the meter, an arm 9 is provided, one end of which is hooked into engagement with the opposite ear 6 of said valve, and the opposite end of said arm is extended through an inclined slot 9' in the sleeve 3 and an opening 10 in the connecting member 4'.

The arm 9 after being extended through the opening 10 so as to dispose the valve beyond the seat 4, is soldered within the opening, as shown at 11, so as to retain said valve in its open position. Thus, it will be seen that as long as no heat is applied, the ball valve remains in this open position, but should the temperature become higher than the melting point of the solder 11, the latter will melt, thereby allowing the arm 9 to be released and the spring to draw said valve into the seat 4, whereby the flow of gas to the meter will be cut off. As the solder retaining the arm 9 melts at a lower temperature than the lead connections on the meter 1, it will be seen that by the time the heat becomes sufficiently great to melt said lead connections, there will be practically little or no gas within said meter.

In Fig. 2, I have shown a slightly modified form of construction in which the sections 12 and 13 are connected by means of a union 14, the bore of this union being also of greater diameter than the diameter of the bores of the sections 12 and 13. The section 13 is provided at its end adjacent the union 14, with a flared inner periphery, as shown at 15, to form a seat or the like for a ball valve 16. This valve is also provided with an ear 17, to which is engaged one end of an arm 18, and said arm is extended through an opening 19 formed in a wall of the section 13. The portion of this section 13 through which the opening 19 is provided, is somewhat bent, as disclosed at 20, and the arm 18 is extended through said opening and engaged with one end of a coil spring 21, said coil spring having the opposite end thereof engaged with one end of a bolt 22 extending through said section 13. The tendency of the spring 21 is to draw the valve 16 closed on the seat 15 to shut off the flow of gas through the sections of the pipe, and in order to retain said valve in its open position, the arm is soldered, as shown at 23, within the opening 19. This will allow the gas to flow through the sections until such time as the heat, such as heretofore described, becomes sufficient to melt the solder, whereby the spring will draw the valve closed to cut off the flow of gas. In this particular instance, it will be seen that the spring member 21 is disposed on the outer side of the section of the pipe, but in view of the bent portion of the section at the point through which the opening 19 is provided, said spring is substantially in alinement with the arm to which the valve is secured.

From the foregoing description, it will be seen that I have provided an improved check valve for the purpose of automatically cutting off the flow of gas to the meter when the heat becomes so great as to melt the solder which holds the arm secured to the valve. It will further be seen that in each case, the ball valve, when in its open position, is disposed in a portion of the enlarged union, whereby the same will not, appreciably, affect the flow of gas therethrough. It will still further be seen that the device is of such simple construction as to be readily and cheaply manufactured, and one which will effectively carry out the purpose for which the same is designed.

What I claim is:—

1. A device of the class described, comprising a pair of pipe sections, connecting means therebetween, one of said pipe sections being provided with a valve seat at the connected end thereof, a ball valve for the seat, a coil spring having connection with the pipe section having the seat therein and acting on said valve to tend to seat the same, and means to retain said valve in its open position, said means being ineffective at a predetermined temperature.

2. In a device of the character described, the combination with a pair of pipe sections, one of said sections being provided with a valve seat in the end thereof, a sleeve of enlarged diameter disposed between said sections, and connecting members between said sleeve and pipe sections; of a valve, a spring having connection with said valve and the pipe section having the valve seat tending to draw said valve into said seat, an arm also carried by said valve and extending through an opening in one of said connecting members, and means coöperating with said arm in the opening to normally retain said valve in an open position.

3. In a device of the character described, the combination with a pair of pipe sections, one of said sections having a valve seat in the end thereof, tubular connecting means between said sections, said means having an orifice therein; of a valve, a spring connected to said valve and the pipe section having the valve seat therein, an arm also engaged with said valve and extending through the orifice in said connecting means, and means applied to said arm in the orifice to normally retain said valve in an open position.

4. In a device of the class described, the combination with a pair of pipe sections, one of which has a valve seat in one end thereof, a sleeve of enlarged diameter disposed between said pipe sections, said sleeve having an inclined slot extending through the wall thereof, and a pair of connecting members between said pipe sections and said sleeve, one of said connecting members having an opening therein alining with the slot of said sleeve; of a valve, a spring having connection with said valve and the pipe section having the valve seat therein, an arm also engaged with said valve, said arm being extended through the slot in said sleeve and the opening in said connecting member, and means applied to the arm in said opening to normally retain said valve in its open position.

In testimony whereof I hereunto affix my signature in the presence of two witnesses.

BYRON STEVENS.

Witnesses:
L. C. LEET,
HOWARD J. PEIRSOL.

Copies of this patent may be obtained for five cents each, by addressing the "Commissioner of Patents, Washington, D. C."